J. LIEBICH.
LIQUOR CONTAINING CONFECTION.
APPLICATION FILED SEPT. 3, 1907.

943,945.

Patented Dec. 21, 1909.

Witnesses:

Inventor:

UNITED STATES PATENT OFFICE.

JULIUS LIEBICH, OF GÖRLITZ, GERMANY.

LIQUOR-CONTAINING CONFECTION.

943,945.   Specification of Letters Patent.   Patented Dec. 21, 1909.

Application filed September 3, 1907. Serial No. 391,182.

*To all whom it may concern:*

Be it known that I, JULIUS LIEBICH, private person, a subject of the German Empire, residing at Görlitz and Empire of Germany, have invented certain new and useful Improvements in Liquor - Containing Confections, of which the following is a specification.

My invention relates to an improved confection containing a drink or liquor of any kind, and the object of my invention is to offer a confection of the said kind, which not only provides great facility in emptying or sucking the drink from the hollow frame or body of the confection, but also materially enlarges the eatable substance containing the drink or liquor.

The object is obtained by forming the capsule or hollow body proper, serving to receive and retain the drink, with two projecting lugs or extensions pieces, suitably located at opposite ends of said capsule and adapted to be easily broken off by biting or by hand, thus allowing air to enter at one end of the hollow body, whereby the escape of the drink at the other end, by suction or by simply pouring out, may be readily obtained. And I further obtain the object of my invention in surrounding the capsule proper or receptacle of the drink by an outside cover of any eatable substance, such as cake, chocolate or the like, to increase the eatable substance offered with the drink and to protect the capsule proper against any injury from outside.

To make my invention properly understood, I have illustrated the same in the accompanying drawings, in which—

Figure 1:
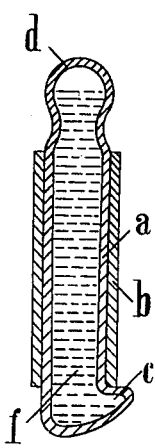
Figure 2:
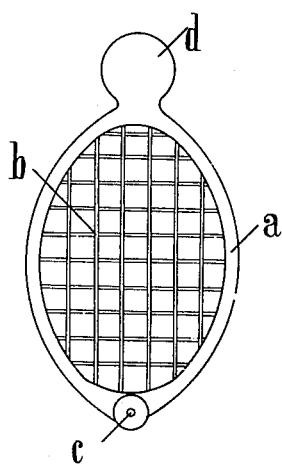

Figure 1 represents a vertical section through the confection made according to this invention, and Fig. 2 is a front elevation of the same.

Referring to the drawings, *a*, is the capsule or hollow body preferably made of sugar in the well-known manner to retain the liquor without undergoing solution by the same. *b*, is an envelop or casing for the capsule *a*, consisting of any suitable eatable substance, such as biscuit, cake, chocolate, sugar or any eatable compound; the said envelop or cover may surround the whole of the capsule *a*, but I prefer to make the latter project from the envelop at the top and bottom end, which project in the form of lugs or extension-pieces *c*, and *d*, suitably shaped in a manner to be easily broken off by hand or by biting. The said lugs or extension-pieces *c*, *d*, serve, first, to fill the liquor or drink *f*, into the capsule *a*, and, after closing the capsule, to exhaust the contents of the capsule either by sucking or by pouring the drink *f*, out of the capsule *a*, for consuming the same. By breaking off the said lugs *c*, and *d*, the atmosphere will enter at one end and thereby allow the liquid to flow or to be readily poured or sucked out at the other end, without destroying the whole capsule *a*, thereby avoiding waste of the liquor and spoiling of clothes etc.

The envelop or cover *b*, of the capsule *a*, will help to strengthen the capsule against being broken, and it equally serves as an eatable cake, biscuit or refreshment to be consumed along with the drink contained in the hollow receptacle *a*.

The shape and size of the capsule proper *a*, as well as of the envelop or cover *b*, may vary as well as the material of which the eatable capsule *a*, and the cover *b*, are formed, also the drink *f*, contained within the capsule *a*, may vary.

I claim as my invention:

1. A liquor containing confection the body of which has extension pieces adapted to be broken off for admitting air through one and exhausting the liquor from the other extension piece, substantially as and for the purpose set forth.

2. In a liquor containing confection the body of which has extension pieces adapted to be broken off, a cover of eatable substance upon the body of the hollow confection, substantially as and for the purpose set forth.

3. In a liquor containing confection the body of which has extension pieces the combination with the body of the confection, of a cover of eatable substance surrounding the body of the confection, an extension piece of the hollow body of the confection projecting on one side of the cover and an extension piece of the hollow body of the confection projecting at the opposite side of the cover, substantially as and for the purpose set forth.

In testimony whereof I have hereunto set my hand in the presence of two witnesses.

JULIUS LIEBICH.

Witnesses:
PAUL ARRAS,
CLÄRE SIMON.